Dec. 30, 1958 D. B. SMITH 2,866,846

TELEVISION COLOR SATURATION CONTROL SYSTEM

Filed Sept. 10, 1951

INVENTOR
DAVID B. SMITH
BY Allen V. Hazeltine
ATTORNEY 2,866,846

TELEVISION COLOR SATURATION CONTROL SYSTEM

David B. Smith, Meadowbrook, Pa., assignor to Philco Corporation, Philadelphia, Pa., a corporation of Pennsylvania Application September 10, 1951, Serial No. 245,806

5 Claims. (Cl. 178—5.4)

Figures 1, 2:
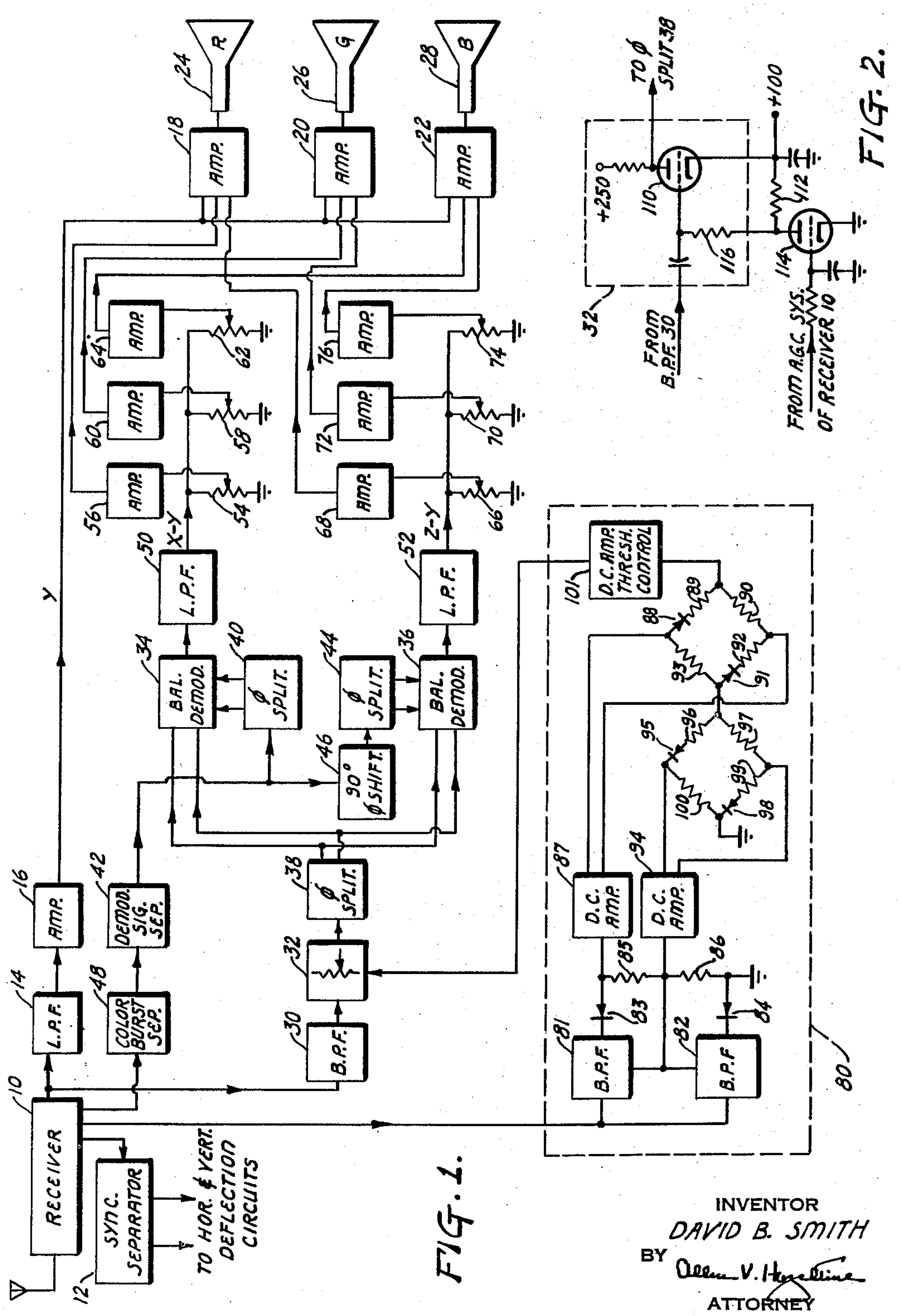

The present invention relates to color television receiving systems and more particularly, to color television systems in which the video color wave for producing a color image at a receiving position comprises a plurality of signal components definitive of the brightness and chromaticity of the image to be reproduced.

To produce a video color wave of the foregoing type, there may be derived at the transmitter, by means of appropriate camera units, three signals indicative of three color-specifying parameters of successively scanned elements of a televised scene. For reasons which will become more apparent hereinafter, these three signals are preferably such as to specify the image colors with respect to three imaginary color primaries "X," "Y" and "Z" as defined by the International Commission on Illumination (ICI). With this choice of primaries, the Y signal represents the brightness of the image as preceived by the human eye, while the X and Z signals contain the remaining intelligence as to image color. Since the specification of any color in terms of any given set of primaries may be converted to a specification of the same color in terms of any other set of primaries by means of simple linear transformations, the transmission of the X, Y and Z signals makes available at the receiver the required information from which the signals necessary to excite three real primary-color sources may readily be derived by simple electrical matrixing circuits.

In a preferred arrangement for segregating the apportioning the intelligence concerning the X, Y and Z components of the color image at the transmitter, these components are combined to form two difference signals $(X-Y)$ and $(Z-Y)$ which are transmitted in respectively different phase relations as amplitude-modulation of a subcarrier signal. The modulation of the subcarrier is preferably effected by means of balanced modulators, so that no subcarrier signal is generated when the difference signals $(X-Y)$ and $(Z-Y)$ are zero, i. e. when image elements which are white or gray are scanned. However, when colored image elements are scanned, either or both of the difference signals $(X-Y)$ and $(Z-Y)$ will differ from zero, producing a subcarrier signal having a phase determined by the relative values of the difference signals and hence by the hue of the image, and an amplitude determined by the absolute values of the difference signals and hence by the saturation of the image color. The modulated subcarrier signal, therefore, may be considered as a chromaticity signal having a phase and amplitude representative of the hue and saturation respectively, of the color of the image.

It has has been found that the human eye is relatively inacute in discerning abrupt color variations due to chromaticity changes alone. Therefore, the spectrum of the chromaticity signal may be made relatively narrow without substantial loss of useful information. For example, the chromaticity information may be limited to a frequency spectrum of .6 mc./sec. and, in a practical arrangement wherein the subcarrier frequency is equal to approximately 3.6 mc./sec., the modulated chromaticity signal may have sidebands extending from 3 to 4.2 mc./sec. The frequency range below the chromaticity signal spectrum may then be utilized for transmitting the Y signal, which as above pointed out represents the brightness variations of the image. The frequency spectra of the two components of the transmitted signal may overlap to a greater or lesser degree depending on the amount of detail information to be transmitted for a video channel of given permissible bandwidth and the particular modulation frequency selected. However, the frequency spectra of the components may be made mutually exclusive by means of appropriate filter elements limiting the bandwidth of the respective color signals.

Since the modulated subcarrier component of the video wave defines the chromaticity of the image for a given value of the brightness of the image, any interference superimposed on the subcarrier component, for example in the transmission medium, will manifest itself as a change in the chromaticity of the image. In reception areas beyond the primary service area of the transmitter, it is found that the reproduced color image at the receiver may be deteriorated to such an extent, by the noise superimposed on the subcarrier wave component of the video signal, that the reproduced image is no longer visually acceptable.

It is an object of the invention to provide a color television receiving system capable of producing a visually acceptable color image under adverse receiving conditions.

Another object of the invention is to provide novel interference limiting means for a color television receiver.

These and further objects of the invention will appear as the specification progresses.

In accordance with the invention, the foregoing objects are achieved in a color television system by so modifying the received video wave that the signal portion thereof defining the saturation of the colors to be reproduced is varied proportionally to the interference at the receiver without correspondingly modifying the signal portions of the video wave defining the brightness and hue of the colors to be reproduced. More particularly, I have found that, in the reproduction of a color television image under adverse conditions, a color image normally unacceptable because of superimposed interference may be made visually acceptable by reducing the saturation of the colors of the image without correspondingly varying the hue or brightness of the image. Thus, in a specific color television system, wherein the brightness of the reproduced image is determined by a first video component in the form of a signal of extended bandwidth and the hue and saturation of the colors of the reproduced image are defined by the phase and amplitude respectively, of a carrier wave component of the video wave, I provide appropriate means for varying the amplitude of the carrier wave component as a function of the amount of interference superimposed on the video wave without correspondingly varying the phase of the modulated wave or varying the amplitude of the brightness component. In a preferred arrangement of the invention the amplitude of the carrier wave component is adjusted automatically proportionally to the signal-to-noise ratio of the incoming video wave.

The invention will be described in greater detail with reference to the appended drawing forming part of the specification and in which:

Figure 1 is a block diagram, partly schematic, showing a receiving system in accordance with the invention; and Figure 2 is a schematic diagram illustrating another form of control system which may be used in the system of the invention.

Referring to Figure 1, the system thereshown comprises a receiver 10 for the incoming video signal which may be modulated on a transmitted carrier wave in any well known manner. The receiver 10 may be of conventional design and include the usual radio frequency amplifier, frequency conversion and detector stages.

In a typical form, the incoming video signal comprises time-spaced horizontal and vertical synchronizing pulses recurrent at the horizontal and vertical scanning frequencies, and the color video wave occurring in the intervals between the horizontal pulses. The incoming video signal may further include a marker signal for providing a phase reference for the color signals of the color video wave, such a marker being usually in the form of a burst of a small number of cycles of carrier signal having a frequency equal to the frequency of the chromaticity signal component of the video wave and occurring during the so-called back porch interval of the horizontal scanning pulses.

The synchronizing pulses contained in the received video signal are selected by a synchronizing signal separator 12 of conventional form and subsequently energize, in well known manner, suitable horizontal and vertical deflection circuits of an image reproduced later to be described.

The video color wave may be formed at the transmitter in a number of different manners. Preferably, the video wave is generated at the transmitter in accordance with the principles set forth in the copending application of Frank J. Bingley, Serial No. 225,567, filed May 10, 1951. As described in said application, the image to be televised is resolved into three color signals, X, Y and Z, the Y signal of which represents the brightness of the image and is proportional to the energy distribution of the light emitted by the image as weighted by a color mixture curve having a shape and ordinate scale substantially identical to the shape and ordinate scale of the curve of the relative luminosity of the spectral colors to the eye. The second and third color signals X and Z are made proportional respectively to the energy distribution of the light emitted by the image as weighted by second and third color mixture curves having shapes and ordinate scales complementing the shape and ordinate scale of the first curve and defining therewith the chromaticity of the image. In one of the systems specifically described in the said application of Frank J. Bingley, the Y signal is utilized directly to form one component of the color video wave without being previously modulated, and the X and Z signals, modified by the Y signal to produce two difference signals $X-Y$ and $Z-Y$ respectively, are modulated in phase quadrature on a subcarrier to produce the modulated wave component of the color video wave. The color video wave so constituted comprises a first component signal of relatively wide bandwidth, and further comprises a second component signal in the form of a modulated subcarrier having a subcarrier frequency equal to the modulating frequency at the transmitter and sidebands which are determined by the particular information sampled at the transmitter and the amplitude of which defines the saturation of the colors of the image.

The invention will be further described with reference to the use of a video wave generated in accordance with the principles of the said copending application of F. J. Bingley as above noted. However, it should be well understood that the principles of the invention are equally applicable to systems utilizing video waves constituted in ways other than that above discussed and disclosed in the said copending application, so long as the wave has a signal thereof which is variable and independently indicative of the saturations of colors of the image. Such a video wave may, for example, be of the type produced by consecutive dot-by-dot sampling of three continuous color signals generated by three separate camera tubes and indicative of the red, green and blue color components of the image elements. A wave so generated is substantially in the form of a sine wave superimposed on a reference level component. The frequency of the sine wave is established by the rate at which the continuous color signals are sampled and the sine wave exhibits amplitude variations proportional to variations in the saturations of the colors of the image and phase variations which are proportional to the variations in the hue of the colors of the image.

The video color wave is separated into its two components by means of a low pass filter 14 and a band-pass filter 30, whereby, at the output of filter 14, there is derived the low frequency component of the video wave containing the brightness information of the image and indicated in the drawing as signal Y, and at the output of the filter 30 there is derived the modulated subcarrier component of the video wave indicative of the chromaticity information of the image. The frequency passbands of the filters 14 and 30 are selected in consonance with the standards of the transmission system and a typical value for the passband of filter 14 is 0–3 mc./sec. and for the filter 30 is 3–4.2 mc./sec. when a subcarrier frequency of approximately 3.6 mc./sec. is used at the transmitter.

The Y signal is supplied through an amplifier 16 to three combining amplifiers 18, 20 and 22 which in turn energize cathode-ray tubes 24, 26 and 28 respectively, to control the intensities of the light emitted thereby. Although the color image-reproducing means, may, in some instances, comprise a single tube, in the system specifically shown, the image reproducing system comprises three separate tubes, which have luminescent screens producing light of the chosen red, green and blue additive primary colors, respectively. A suitable optical superposing system (not shown) may be provided for precisely superposing the images of the screens of the three cathode-ray tubes to achieve the desired mixing of the colors of the screens. By suitable adjustment of the gains of amplifiers 18, 20 and 22, the superposed images of the three cathode-ray tube screens may be made to produce a white or gray image when supplied only with the Y signal from the amplifier 16. Thus, the Y signal is caused to control the formation of a resultant black-and-white image comprising brightness changes only.

The brightness of the three cathode-ray tubes varied in accordance with the variations of the Y signal, is further modified by supplying each of the tubes 24, 26 and 28 with appropriate amounts of the difference signals $(X-Y)$ and $(Z-Y)$ so as to establish the proper chromaticity of the final resultant image. For this purpose, the chromaticity signal, derived from the detected video wave by means of a band-pass filter 30 is applied to a variable attenuation network 32 and thereafter through a phase splitter 38 to two balanced demodulators 34 and 36 which in turn are coupled to the cathode-ray tubes through appropriate networks hereinafter to be described.

Phase splitter 38 may conveniently comprise a triode amplifier stage having plate and cathode load circuits of equal impedance values and is operative to convert the signal applied thereto from the attenuation system 32 into push-pull form. Balanced demodulators 34 may comprise a pair of pentagrid vacuum tubes having their cathodes grounded through a common resistor, their suppressor grids connected to their cathodes, their second and fourth grids supplied with a positive potential from a suitable source, and their plates supplied with a positive potential through a common plate load circuit. The push-pull signal from the phase splitter 38 may be applied to the first grid of each of the tubes, whereas the third grids of the tubes are excited in push-pull relationship by a demodulation signal at the subcarrier frequency by means of a phase splitter 40 coupled to a demodulation signal generator 42.

The balanced demodulator 36 may be similar in construction to demodulator 34, and similarly have its first grids excited in push-pull from the phase splitter 38. The third grids of the demodulator 36 are energized in push-pull from a phase splitter 44, the latter being coupled to the generator 42 through a 90° phase shifter 46 whereby the grids of demodulator 36 are energized in phase quadrature to the grids of demodulator 34.

To establish the operating frequency of the demodulation signal generator 42 at the frequency of the subcarrier chromaticity signal derived from the band-pass filter 30, the generator 42 is energized in proper synchronism by means of the color burst marker signal contained on the video wave. For this purpose, the generator 42 is coupled to the receiver 10 through a color burst signal separator 48 as shown. Suitably, the generator 42 may comprise a controlled oscillator such as described in the copending application of Joseph C. Tellier, Serial No. 197,551, filed November 25, 1950, now Pat. No. 2,740,046, granted March 27, 1956, and the color burst signal separator may consist of a suitable filter tuned to the frequency of the color burst marker signal.

The output of balanced demodulator 34 is preferably passed through a low-pass filter 50, having a passband extending from zero to the maximum frequency of the chromaticity signals modulated on the subcarrier of the video color wave, the output signals of this filter then comprising the separated $X-Y$ signals in a frequency band 0–.6 mc./sec., in the present embodiment. Similarly, the output signal from balanced demodulator 36 is preferably passed through low-pass filter 52, also having a passband similarly limited, whereby there is obtained the separated $Z-Y$ signal in the hand 0–.6 mc./sec.

Although a detailed analysis of the theory of operation of the transmission system comprising the transmitter and receiver arrangement utilized for translation of the $Y-Y$ and $Z-Y$ signals is not necessary to an understanding of the present invention, the following general facts are conducive to a greater appreciation of the general type of operation here involved. Analysis of the chromaticity signal-transmission system indicates that the output signal from low-pass filter 50, for example, may have the form:

$$(\cos \phi)(X-Y)+(\sin \phi)(Z-Y)$$

Here, $\phi$ represents the angular difference between the demodulating signal supplied to demodulator 34 and a reference phase of the subcarrier signal as represented by the phases of the oscillations in the received marker signal bursts. In the case of signals from filter 50, $\phi$ is zero. Accordingly, the coefficient of the $Z-Y$ term in the above expression is zero, while that of the $X-Y$ term is 1. Therefore, only the $X-Y$ signal appears at the output of low-pass filter 50. On the other hand, the demodulating signal supplied to balanced demodulator 36 differs by 90° from the reference phase established by the subcarrier bursts. Accordingly, the coefficient of $Z-Y$ is 1, while that of $X-Y$ is zero, and, as a result, the output signal from low-pass filter 52 comprises substantially only the $Z-Y$ signal without contamination by the $X-Y$ signal.

In order to control the real red, green and blue primaries represented by the phosphor materials upon the screens of cathode-ray tubes 24, 26 and 28, it is necessary to apply the $X-Y$ and $Z-Y$ signals, as well as the Y signal, to these cathode-ray tubes in the proper proportions. This is accomplished by means of the electrical matrixing network now to be described. The methods for calculating the specification of any color in terms of any three primaries such as red, green and blue, when its specification in terms of three other known primaries such as X, Y and Z are available, are well known in the art of colorimetry, and need not be set forth here in detail. However, it will be noted that when the chromaticities of the red, green and blue primaries represented by the three receiver cathode-ray tubes are known, there may readily be calculated the amounts of X, Y and Z signals which should be supplied to each of the three cathode-ray tubes to effect a matching of the colors represented by these signals, and from this there may readily be determined the amounts of $X-Y$ and $Z-Y$ signals which should be so supplied when equal amounts of the Y signal are supplied to each tube. In the case of commercially realizable phosphor primaries approximating the so-called standard primaries "C," the voltages $V_R$, $V_G$ and $V_B$ which should be applied to the red, green and blue light-producing cathode-ray tubes respectively, may be approximately in the following proportions:

$$V_R=1.0Y+1.76(X-Y)-0.316(Z-Y)$$
$$V_G=1.0Y-0.839(X-Y)+0.085(Z-Y)$$
$$V_B=1.0Y+0.05(X-Y)+1.06(Z-Y)$$

It is understood that these values are cited for purposes of illustration only.

Accordingly, the $X-Y$ signal from low-pass filter 50 may be supplied to amplifier 18 and red cathode-ray tube 24 by way of gain-controlling device 54 and amplifier 56, which may be adjusted to provide the proper proportions of the $X-Y$ signal to the red cathode-ray tube. Similarly, the $X-Y$ signal may be supplied through gain-controlling device 58 and amplifier 60, and through gain-controlling device 62 and amplifier 64, to the green and blue cathode-ray tubes 26 and 28 respectively.

The $Z-Y$ signal from low-pass filter 52 may then be supplied to red cathode-ray tube 24 through gain-controlling device 66 and amplifier 68, and to the green and blue cathode-ray tubes 26 and 28 through gain-controlling device 70 and amplifier 72, and through gain-controlling device 74 and amplifier 76, respectively. By appropriately adjusting these gain-controlling devices and their corresponding amplifiers, the desired matrix parameters, such as those set forth specifically hereinbefore, which accomplish application of the $X-Y$ and $Z-Y$ signals to the three primary-color producing cathode-ray tubes in appropriate proportions, may be realized. It is understood that the polarity of the signals thus supplied may be controlled by the number of stages employed in each matrix amplifier, an odd number of conventional stages effecting a phase-reversal of the signal supplied thereto.

As above pointed out, the Y signal represents the brightness of the image as perceived by the human eye whereas the X and Z signals contain the remaining intelligence as to the image color. Accordingly, variations in the intensity of the images of the screens of the cathode-ray tubes 24, 26 and 28 brought about by the signals $X-Y$ and $Z-Y$ represent departures of the subjective color of the image from white, the direction of the change in color and hence the hue of the optically combined resultant image being determined by the relative values of the signals $X-Y$ and $Z-Y$ for a given value of the signal Y. When the signals $X-Y$ and $Z-Y$ are varied simultaneously by the same relative amounts, the hue of the color of the image remains constant and the saturation of the color is varied so that, for decreasing values of $X-Y$ and $Z-Y$ relative to the amplitude of signal Y, the colors of the image become progressively desaturated.

In accordance with the invention, the subjective effect of interference on the reproduced image is materially reduced by varying the saturation of the colors of the image without simultaneously varying the hue and brightness of the image. For this purpose, the attenuator 32 is arranged in the system specifically described, so as to vary the amplitude of the modulated subcarrier wave applied to the demodulators 34 and 36. It will be noted that the amplitude of the modulated subcarrier component of the video signal defines the saturation of the colors of the image since it establishes the amplitudes of the signals $X-Y$ and $Z-Y$ relative to the amplitude of signal Y, whereas the phase of the modulated subcarrier defines the hue of the colors since it establishes the amplitudes of the signals $X-Y$ and $Z-Y$ relative to each other. Accordingly, varying the amplitude of the subcarrier wave by means of the attenuator 32 brings about the desired independent variation of the saturation.

As specifically shown in the drawing, the control of the degree of saturation of the image colors is automatic, and for this purpose the attenuator 32 may consist of a variable gain amplifier tube, for example a remote cut-off pentode, which is energized by a control voltage inversely proportional to the signal-to-noise ratio of the input signal to the receiver 10. Such a control voltage may be produced by a signal-to-noise ratio detector 80 coupled to the receiver 10. Since the noise interference in the channel adjacent to that occupied by the signal is generally of the same order as the noise interference within the signal channel, detector 80 may take the form of a comparison circuit which measures the noise in the transmission medium adjacent to the spectrum band occupied by the signal and compares the same with the signal level to produce an output control voltage indicative of the ratio of the signal and interference noise.

More particularly, and assuming for the moment a receiver 10 having an intermediate frequency amplifier operating at approximately 25 mc./sec. and a video wave having a frequency band of 0 to 4.2 mc./sec., the detector 80 may comprise two bandpass filters 81 and 82 having their inputs connected in common to the intermediate frequency amplifier of receiver 10. Filter 81 may have a passband from 25–29.2 mc./sec., thereby passing the video signal and its superimposed noise, whereas filter 82 may have a passband of 29.2–30 mc./sec., thereby passing the noise adjacent to the frequency band of the video signal. By means of a diode 83 coupled to the filter 81 there is produced across a load resistor 85 a first voltage indicative of the intensity of the video signal and its superimposed noise. By means of a diode 84 coupled to the filter 82 there is produced across a load resistance 86 a second voltage indicative of the intensity of the noise adjacent to the frequency band of the video signal. The resistances 85 and 86 are connected in series with the respective signals in opposition so that the resultant voltage across both resistors and appearing at the cathode of diode 83 will be indicative of the signal intensity, and the resultant voltage appearing at the junction of the resistances will be indicative of the noise. The two voltages so generated are applied to individual D.-C. amplifiers 87 and 94 respectively, of conventional design, which amplifiers serve as buffers and provide two independent bipolar output voltages. Thus, the amplifiers may be of the form described by A. W. Sear in the publication "Electronics," January 1940, pages 28 and 29. The output of amplifier 87 is applied to the input terminals of a bridge network the first arm of which consists of a copper oxide rectifier 88 and resistance 89, the second arm of which consists of a resistance 90, the third arm of which consists of a copper oxide rectifier 91 and a resistance 92 and the fourth arm of which consists of a resistance 93. The output of amplifier 94 is applied to the input terminals of a similar bridge network consisting of copper oxide rectifiers 95 and 98 and resistances 96, 97, 99 and 100. Bridges of this type have been described by H. E. Kallman in the publication "Electronics," August 1946 at pages 135 and 136, published by McGraw-Hill Publishing Company, New York, and are characterized by the feature that an output voltage having a value which is the logarithm of the value of the input voltage may be derived therefrom. By connecting the output terminals of the two bridges in series, as shown, and by properly phasing the input voltages a resultant output voltage may be obtained which represents the difference of the logarithms of the signal and noise voltages applied to amplifiers 87 and 94 respectively, and which therefore, is a measure of the signal-to-noise ratio of the signal applied to the receiver.

A D.-C. amplifier 101 of conventional form may be included in the output circuit to increase the amplitude of the output signal and may embody a suitable bias supply establishing the operating point of the attenuator 32. Preferably the amplifier 101 embodies an amplitude level control whereby an output control voltage is produced only at signal-to-noise levels lower than a predetermined value at which objectionable deterioration of the image would occur without the use of the present invention.

Conveniently, and based on the normally to be expected condition in which the interference noise will be proportionally greater at lower signal intensities, the degree of saturation of the image colors may be controlled as a function of the signal intensity. A control system based on this mode of operation is shown in Figure 2. In the system thereshown the variable attenuating network 32 of Figure 1 comprises a discharge tube 110 having its grid and anode electrodes coupled to the band-pass filter 30 and the phase splitter 38 respectively of the system of Figure 1. The cathode of the tube 110 is returned to ground potential through a series network comprising a cathode resistor 112 and the anode-cathode path of a discharge tube 114. The D.-C. return for the grid of tube 110 is provided by a grid resistor 116 interconnecting the grid of tube 110 and the junction of resistor 112 and the anode of tube 114. By supplying a positive potential, for example of the order of 100 volts, to the cathode of tube 110 the tube 110 will operate at a grid-bias determined largely by the relative impedance values of the resistor 112 and the tube 114 so that, as the impedance of tube 114 increases a smaller voltage drop will occur across resistor 112 and hence a smaller bias voltage is applied to the grid of tube 110.

In its usual form, the receiver 10 comprises a carrier wave detector, or other equivalent system, for producing a negative potential having an amplitude proportional to the intensity of the applied signal, which potential is used as an automatic gain control (AGC) voltage for regulating the amplification of the amplifier stages of the receiver. Therefore, by connecting the grid of tube 114 to this source of negative potential, the impedance of the tube 114 may be controlled as a function of the intensity of the signal applied to the receiver 10.

The operation of the control system shown in Figure 2 may be summarized as follows: Under strong signal conditions at which a large AGC voltage is applied to the grid of tube 114, the impedance of tube 114 is relatively high compared to the impedance of resistor 112 so that only a small bias voltage is applied to the grid of tube 110. Tube 110 then operates to provide a normal predetermined amplification of the modulated subcarrier applied from the band-pass filter 30. At progressively weaker signals applied to the receiver 10, the progressively smaller AGC voltage applied to tube 114 produces a corresponding decrease of the impedance of the tube 114 and an accompanying increase in the grid bias of tube 110 thereby progressively decreasing the amplification of tube 110 and hence the amplitude of the subcarrier applied to the phase splitter 38.

The control system may be made to exhibit a threshold effect by which the amplification of the tube 110 is diminished only at signal levels lower than a predetermined value at which an undesirable amount of noise superimposed on the signal is normally to be expected. This effect may be achieved by the use of a tube 114 having a plate-current versus grid-voltage characteristic so related to the operating parameters of the tube that cut-off is produced whenever the AGC voltage applied to the tube, and hence the strength of the received signal, is greater than the desired established threshold value. Since the tube 114 is thus cut off at the established threshold value, increases in signal strength above this value will not affect the impedance thereof nor the bias voltage applied to tube 110. At signal levels below the threshold value, at which the anode-cathode path of tube 114 is conductive, impedance and related bias voltage variations will be produced in the manner above described.

It is apparent that the simultaneous control of the amplitudes of the signals $X-Y$ and $Z-Y$ to thereby control the saturation of the colors of the image may be effected in other ways than that specifically shown. More particularly, since the amplitudes of the signals appearing at the outputs of the balanced modulators 34 and 36 are proportional not only to the amplitude of the subcarrier signal derived from the phase splitter 38, but also a function of the amplitude of the demodulating signal from the generator 42, the desired control may be achieved by means of an attenuating system similar to the attenuating system 32 arranged in the output of the generator 42 and suitably controlled for example by the signal-to-noise detector 80.

Alternatively, an equivalent control of the saturation, may be obtained by two simultaneously controlled variable attenuators which are arranged in the outputs of the demodulators 34 and 36. Thus in this arrangement the simultaneous control of the amplitudes of the signals $X-Y$ and $Z-Y$ takes place following the demodulation of the subcarrier whereas, in the preferred arrangement specifically shown in the drawing, the control takes place at a portion of the system prior to the demodulation of the subcarrier.

While I have described my invention by means of specific examples and in a specific embodiment, I do not wish to be limited thereto for obvious modifications will occur to those skilled in the art without departing from the spirit and scope of the invention.

What I claim is:

1. A color television receiving system for reproducing a color television image as defined by a color video wave having a modulated component thereof having amplitude and phase variations establishing variations of the saturation and the hue respectively of the colors of said image, said color video wave having a further component establishing the brightness of said image and establishing with said modulated component the chromaticity of said image, said system comprising means responsive to said color video wave to produce a color image having variations in brightness, hue and saturation proportional to variations of said signal components, a first transmission channel for said modulated component, a second transmission channel for said second component, means within said first channel to derive from said modulated wave two color component signals, means coupled to said second channel and to said deriving means to apply said second component and said two color component signals to said image reproducing means, the magnitude of the amplitude variations of said modulated component being adjustable independently of the said phase variations thereof, and means within said first channel for adjustably controlling the magnitude of the amplitude variations of said modulated component independently of the said phase variations thereof to thereby vary the saturation of the colors of said image without simultaneously varying the brightness and hue of the colors of said image, said last-named means comprising a transmission path having an attenuation proportional to a control signal applied thereto, and further comprising means to produce a control signal indicative of the intensity of said color video wave, and means to apply the said control signal to said transmission path to vary the attenuation thereof proportionally to the intensity of said color video wave.

2. A color television system as claimed in claim 1 wherein the said color video wave is impressed on a modulated video signal having a frequency spectrum of given maximum extent and wherein said control signal producing means comprises a signal-to-noise ratio detector and means for applying to said detector said video signal and interference noise signals arising in the frequency band adjacent to the frequency band of the said video signal.

3. A color television system as claimed in claim 1 wherein said color video wave is impressed on a modulated video signal, and wherein said control signal producing means comprises a carrier level responsive system adapted to produce a control signal proportional to the absolute magnitude of the said video signal.

4. A color television system as claimed in claim 1 wherein said control signal producing means comprises means for rendering the same operative solely for intensities of said color video wave below a given threshold value.

5. A color television receiving system for reproducing a color television image as defined by a color video wave having a first component having amplitude and phase variations proportional to variations of the saturation and hue respectively of the colors of said image and having a second component having an amplitude value proportional to the brightness of said image and defining with said first component the chromaticity of said image, said first component being in the form of a modulated wave having a given subcarrier frequency and a frequency spectrum of a predetermined maximum value and said second component having a frequency spectrum of a given maximum value and arranged substantially contiguous to the frequency spectrum of said first component, said system comprising receiving means of a video signal modulated by said color video wave, means responsive to said color video wave to produce a color image having variations in brightness, hue and saturation proportional to variations of said components, first and second transmission channels, frequency selective means coupled to said receiving means and to said channels to selectively apply said first component to said first channel and said second channel, modulating means in said first channel to derive from said first component two color signals, means to vary the saturation of the colors of said image without simultaneously varying the brightness and hue of the colors of said image comprising a variable attenuation path in said first channel interposed between said frequency selecting means and said modulating means, means to derive from said receiving means a control quantity indicative of the intensity of the said video signal, means to apply said control quantity to said attenuation path to vary the attenuation thereof proportionally to the intensity of said video signal, and means coupled to said channels to apply said two color signals and said second component to said image reproducing means.

References Cited in the file of this patent

UNITED STATES PATENTS

| | | |
|---|---|---|
| 2,492,926 | Valensi | Dec. 27, 1949 |
| 2,566,693 | Cherry | Sept. 4, 1951 |
| 2,657,253 | Bedford | Oct. 27, 1953 |
| 2,774,072 | Loughlin | Dec. 11, 1956 |

FOREIGN PATENTS

| | | |
|---|---|---|
| 689,821 | Great Britain | Apr. 8, 1953 |
| 708,088 | Great Britain | Apr. 28, 1954 |

OTHER REFERENCES

"A Six Megacycle Compatible High Definition Color Television System," Television, vol. VI, pages 270–290, published by RCA Review.

"Simplified Receiver for the RCA Color Television System," RCA Bulletins on Color Television and UHF (October 1949 to July 1950), published RCA Laboratories Division.